US006272232B1

United States Patent
Delhomme et al.

(10) Patent No.: US 6,272,232 B1
(45) Date of Patent: Aug. 7, 2001

(54) METHOD FOR PERFORMING A MORPHOLOGICAL SURVEY OF GEOLOGICAL FORMATIONS TRAVERSED BY A BOREHOLE

(75) Inventors: Jean-Pierre Delhomme, Boulogne Billancourt (FR); Jean-François Rivest, Gatineau (CA)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 08/335,923

(22) Filed: Nov. 8, 1994

Related U.S. Application Data

(63) Continuation of application No. 08/077,201, filed on Jun. 14, 1993, now abandoned.

(30) Foreign Application Priority Data

Jun. 25, 1992 (FR) .................................................. 9207816

(51) Int. Cl.⁷ .................................................. G06K 9/00
(52) U.S. Cl. .......................... 382/109; 324/338; 367/25
(58) Field of Search ................................. 382/159, 109; 364/421, 422; 324/338, 366, 368, 323, 302; 348/85; 356/241; 367/38, 25, 40, 42, 43, 54, 58, 63, 69; 181/101–108

(56) References Cited

U.S. PATENT DOCUMENTS

| | | | |
|---|---|---|---|
| 4,567,759 | * 2/1986 | Ekstrom et al. | 324/355 |
| 4,745,550 | * 5/1988 | Witkin et al. | 382/109 |
| 4,866,785 | * 9/1989 | Shibano | 382/49 |
| 5,012,193 | * 4/1991 | Chen | 324/366 |
| 5,038,378 | 8/1991 | Chen | 382/109 |
| 5,148,494 | * 9/1992 | Keskes | 382/109 |
| 5,162,994 | * 11/1992 | Torres | 364/422 |
| 5,274,604 | * 12/1993 | D'Angelo et al. | 367/43 |
| 5,311,484 | * 5/1994 | Anderson et al. | 367/38 |
| 5,406,206 | * 4/1995 | Safinya et al. | 324/338 |
| 5,461,562 | * 10/1995 | Tabanou et al. | 364/422 |

FOREIGN PATENT DOCUMENTS

| | | |
|---|---|---|
| 363259 | 10/1983 | (EP) . |
| 110750 | 9/1989 | (EP) . |
| 2 647570 | 5/1989 | (FR) . |

OTHER PUBLICATIONS

J.F. Rivest et al., "Marker–controlled segmentation: an application to electrical borehole imaging," *Journal of Electronic Imaging*, Apr. 1992, vol. 1 (2), pp. 136–142.

R. Nurmi et al., "Heterogeneities in carbonate reservoirs: detection and analysis using borehole electrical imagery," *Geological Application of Wireline Logs*, Geological Society Special Publication No. 48, 1990, pp. 96–111.

Thesis of S. Beucher, "Segmentation d'images et morphologie mathematique," Ecole Normale Superieure des Mines de Paris, Jun. 5, 1990, pp. 224–228.

S. Beucher et al., "Introduction aux outils morphologiques de segmentation," *Traitement d'images en microscopie, balayage et en microanalyse par sonde electronique*, ANRT, 1990.

\* cited by examiner

*Primary Examiner*—Jayanti K. Patel
(74) *Attorney, Agent, or Firm*—William B. Batzer; Leonard W. Pojunas; Keith G. W. Smith

(57) ABSTRACT

A morphological survey of geological formations traversed by a borehole includes constructing, from an initial image of the wall of the borehole representative of variations in a physical parameter of the formation in the longitudinal direction of the borehole ("depth"), and in the peripheral direction of the borehole wall (laterally), a "crossing-component image." The cross-component image includes only those components of the parameter that extend all the way across the initial image from one side of the image to the other. The survey includes determining variations in one or more attributes relating to the parameter in the crossing-component image as a function of depth. The variations providing information relating to morphology to indicate solid zones, bedded zones, or different types of heterogeneous zones, for example.

9 Claims, 5 Drawing Sheets

METHOD FOR PERFORMING A MORPHOLOGICAL SURVEY OF GEOLOGICAL FORMATIONS TRAVERSED BY A BOREHOLE

This application is a file wrappers continuation of parent application Ser. No. 8/077,201, filed on Jun. 14, 1993 now abandoned.

BACKGROUND OF THE INVENTION

The invention relates to surveying the geological formations through which a borehole passes, and more particularly to a method for characterizing their morphology relative to depth down the borehole.

If a physical characteristic such as resistivity is used for evaluating the formations traversed by a borehole, formations can be classified as a function of the following criteria: 1) a formation may be solid, i.e. it has resistivity values that are uniform, either resistive or conductive; 2) it may be non-solid, in which case it may be bedded if it has relatively rapid changes between resistive zones and conductive zones; 3) it may be heterogeneous, in which case it may be of the interwoven type comprising both resistive elements and conductive elements; 4) it may be of the type including resistive inclusions within a conductive background or; 5) it may be of the type having conductive inclusions within a resistive background.

Clearly, the morphological types of underground formations are related to their porosity and to their permeability. In hydrocarbon reservoirs, these parameters are determined to evaluate production potential. It is therefore advantageous to be able to characterize the morphology of formations in accordance with such a classification as specified above.

SUMMARY OF THE INVENTION

The present invention relates to a method enabling geological formations to be characterized with respect to their morphology.

The method of the invention relies on automatically processing an image of the wall of a borehole. Such an image has been available at a resolution of less than 1 cm ever since the introduction of Schlumberger's FMS device (Formation MicroScanner). That device provides an electrical image of the wall of a borehole, i.e. an image in which the intensity of a pixel is a function of the resistivity of the formation.

According to the invention, starting from an initial image of the wall of the borehole representative of variations in a physical parameter of the formation in the longitudinal direction of the borehole ("depth") and in the peripheral direction of the borehole wall ("laterally"), a crossing-component image is constructed which includes only those components of the parameter that extend all the way across the image from one side of the image to the other. Variations in one or more attributes relating to the parameter in the crossing-component image are determined as a function of depth. These variations provide information relating to morphology.

Preferably, the attribute(s) are also determined for the initial image, and the values obtained for the initial image and for the crossing-component image are compared, thereby providing additional information relating to morphology.

In an advantageous implementation, the initial image is made binary to form a two-phase image in which one of the phases (the "white phase") corresponds to relatively high values of the parameter while the other phase (the "black phase") corresponds to relatively low values thereof. The binary image serves as the initial image for constructing the crossing-component image.

Appropriately, the crossing-component image is obtained by eliminating noncrossing components of the white image and non-crossing components of the black image from the binary image of the components.

Appropriately, one of the attributes is determined as a function of the area of the image that is occupied by one of the phases. Another attribute envisaged by the invention is an indicator of the value of the parameter in each of the phases of the binary image.

BRIEF DESCRIPTION OF THE DRAWINGS

An implementation of the invention is described below with reference to the accompanying drawings, in which:

FIG. 1-2 shows a binary image obtained from the image of FIG. 1-1;

FIG. 1-3 shows a crossing-component image constructed on the basis of the binary image of FIG. 1-2;

FIG. 2 shows a classification described in the literature for characterizing the texture of geological formations:

FIG. 3 illustrates the notion of a crossing structure as used in constructing the crossing-component image;

FIG. 4A shows the variations as a function of depth in a median value of conductivity for each of the phases as a function of depth;

FIG. 4B corresponds to the same section and shows variation as a function of depth in the percentage of the area occupied by the black phase respectively in the image of FIG. 1-2 and in the image of FIG. 1-3.

DESCRIPTION OF THE PREFERRED EMBODIMENTS

Figure 1:
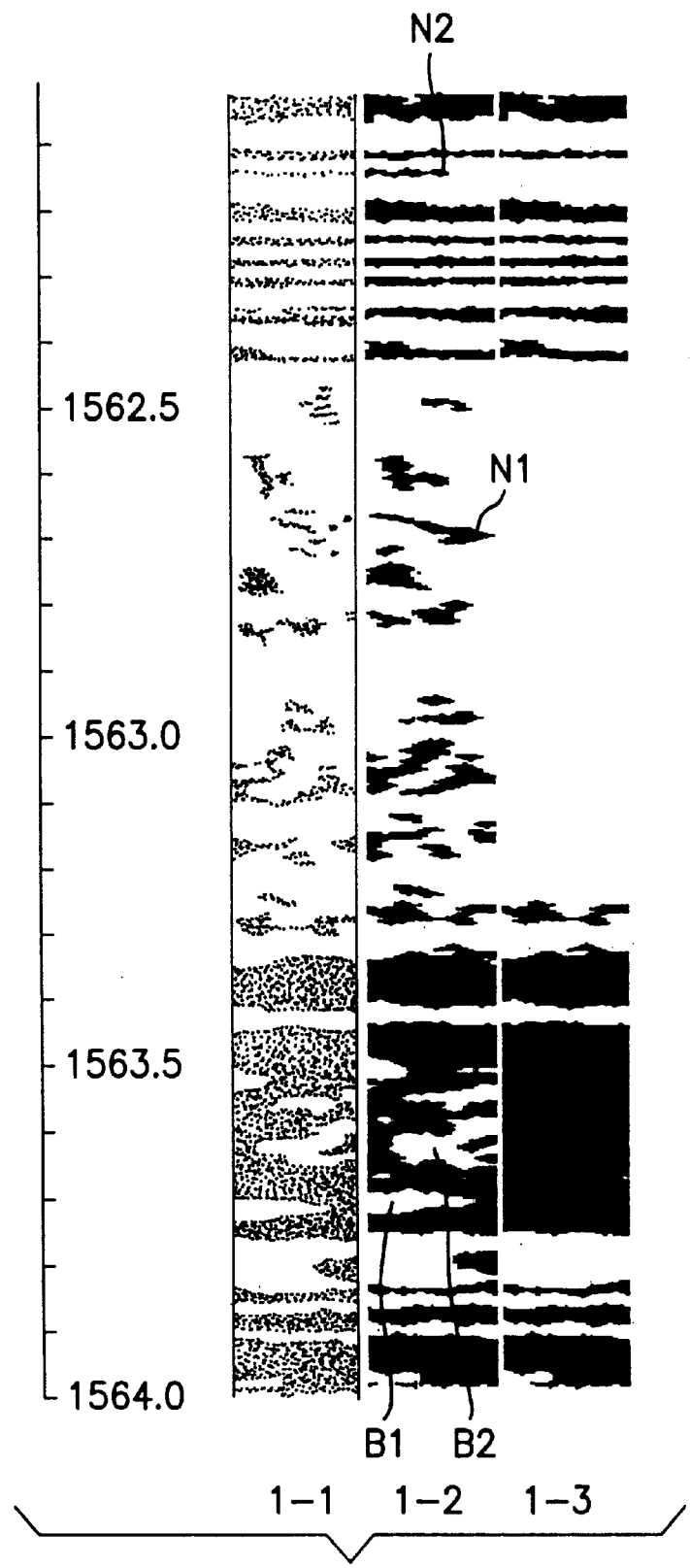
FIG. 1-1 shows an example of a gray-scale image log as obtained from resistivity measurements.

FIG. 1-1 shows the wall of a borehole over a length of about 2 meters as obtained by means of a Schlumberger Formation Micro Scanner (FMS) device. The device includes pads each of which is fitted with a dense array of electrodes, the size of the electrodes and the distance between adjacent electrodes being of the order of 1 cm or less. During the measurement operation which is performed while the device is being raised towards the surface by means of a cable, the pads are pressed against respective sectors of the wall of the borehole. Currents emitted by the electrodes are representative of the resistivity of the formation facing the electrode under consideration. The measurements in the set provided by the electrodes of a pad are combined to produce an electrical image of the wall of the borehole on a gray scale: black corresponding to low resistivity (or high conductivity), while white corresponds to high resistivity. The lateral dimension of the image corresponds to the circumferential direction of the borehole and is limited by the angular sector covered by the array of electrodes. A succinct description of the FMS device is contained in the publication by J. F. Rivest et al. entitled "Marker-controlled segmentation: an application to an electrical borehole imaging", published in the Journal of Electronic Imaging, April 1992, Vol. 1 (2), pp. 136–142, see paragraph 2 "Acquisition" pp. 137–138 and FIG. 2 on page 137.

The method described below seeks to obtain information relating to the morphology of the formations through which the borehole passes by automatic processing of such an image.

Figure 2:
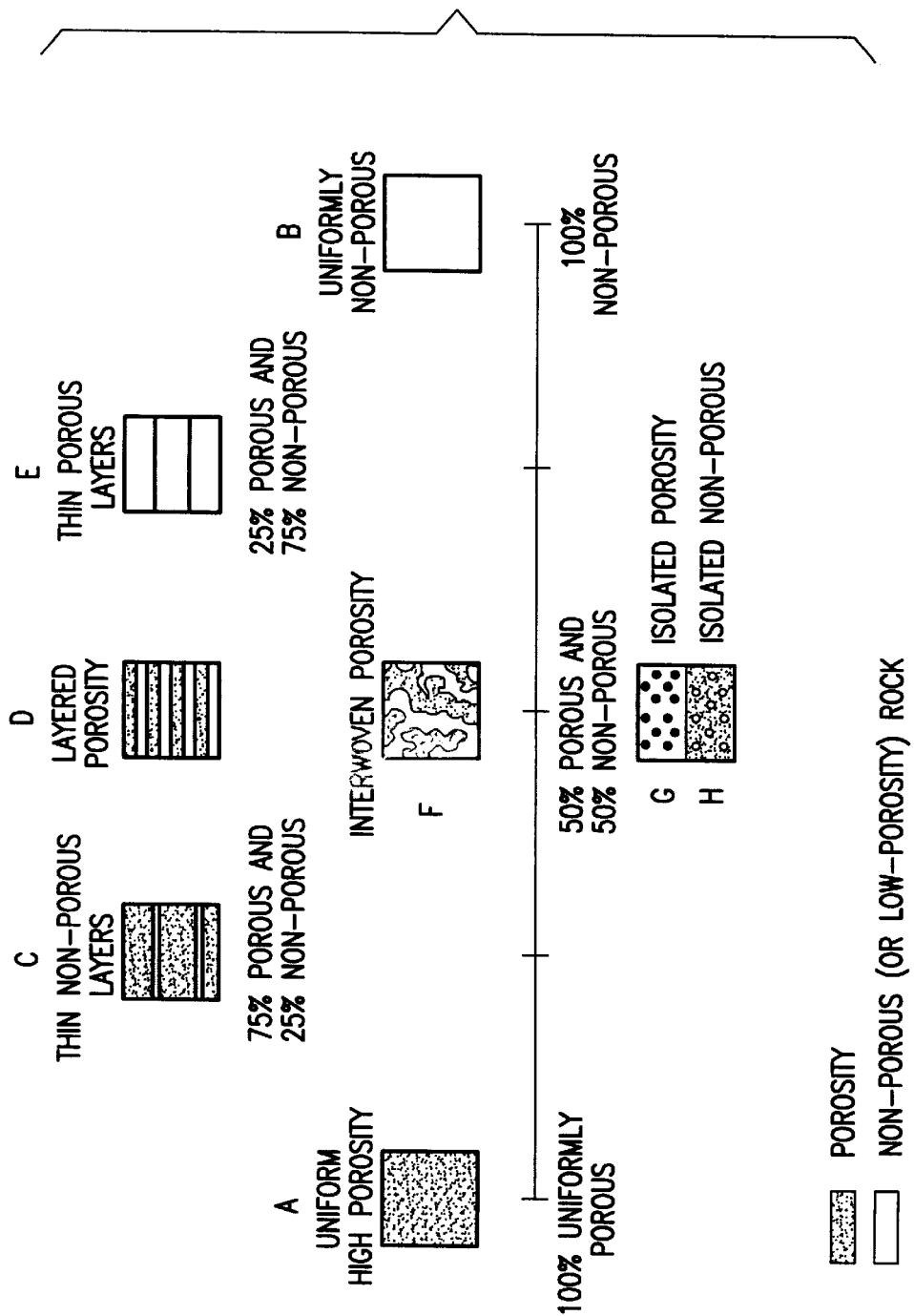

In the present application, the term "morphology" is used to mean the geometrical arrangement of elements of the formation that have a high value for the measured physical parameter (conductivity in the present example), and of elements of the formation having a low value for the parameter. This is illustrated in FIG. 2 which reproduces FIG. 2 at page 99 of the publication by R. Nurmi et al. entitled "Heterogeneities in carbonate reservoirs: detection and analysis using borehole electrical imagery", edited by A. Hurst et al., in "Geological Applications of Wireline Logs", Geological Society Special Publication No. 48, 1990. In that publication, the physical parameter under consideration is porosity (with position on the horizontal axis representing porosity). The morphological classification described is constituted by the following types:

solid zones that may be porous (A) or non-porous (B);

bedded zones formed by alternating porous and non-porous layers of greater or lesser thickness, such bedded zones may be predominantly porous (C), balanced (D), or predominantly non-porous (E);

heterogeneous zones having interwoven porous elements and non-porous elements (F);

heterogeneous zones including porous inclusions in a non-porous background (G); and heterogeneous zones having non-porous inclusions in a porous background (H).

This classification is applicable using a physical parameter other than porosity, in particular electrical conductivity which is the parameter measured for producing the image of FIG. 1. A classification is thus obtained that is pertinent relative to the electrical image of FIG. 1 in which above "porous" is replaced by "conductive" and above "non-porous" is replaced by "resistive".

The method described above seeks to split up the image log as shown in FIG. 1-1 into morphological zones. That is to say, it seeks to split up the image into segments in the depth direction that are homogeneous with respect to morphology.

In the example described with reference to the figures, a first step is provided in which the gray scale image of FIG. 1-1 is made binary, i.e. is transformed into an image having two levels only, namely black and white, as shown in FIG. 1-2. This step is not essential since the method of the invention may be applied to an image having a gray scale or to an image having more than two levels, e.g. having three levels. Nevertheless, conversion to a binary image simplifies subsequent processing.

To perform this binary transformation, each pixel of the initial image is compared with a threshold. All points having conductivity greater than a certain threshold are given black pixels and all points having conductivity less than or equal to the threshold are given white pixels. Various methods may be proposed for determining the threshold. A simple method consists in using a threshold of fixed value. A more sophisticated method, which is preferred, makes use of an adaptive threshold: the threshold is caused to vary with depth as a function of the median level of conductivity at the depth under consideration. This median level corresponds to that which may be called the "background conductivity" of the image. To determine the background value, it is preferable to use the morphological filter described in the above-mentioned publication by J. F. Rivest et al. entitled "Marker-controlled segmentation: an application to electrical borehole imaging", published in the Journal of Electronic Imaging, April 1992, Vol. 1 (2), pp. 136–142. More particularly, reference may be made to paragraph 4 "Artifact elimination" on page 140 of the publication and to FIG. 7 on page 140. The filter in question uses operations that are known in mathematical morphology under the name of opening and closing by reconstruction on the basis of a structuring element r: by a first operation of closing by reconstruction, minima smaller than r are eliminated; then on the basis of the closed image, maxima smaller than r are eliminated by an operation of opening by reconstruction. The pixels that remain unchanged are considered as belonging to the background. The structure element r is appropriately a rectangle whose lateral dimension corresponds to that of the image and whose longitudinal dimension is about 15 cm.

It would also be possible to obtain a binary image by an operation consisting in making up an image from a "mosaic-image" as described in the thesis of S. Beucher entitled "Segmentation d'images et morphologie mathÈmatique" Ecole Nationale Superieure des Mines de Paris, Jun. 5, 1990, pp. 226 et seq.

The result of the first processing step is the binary image of FIG. 1-2 which comprises two phases: a more conductive phase called the "black" phase and a less conductive phase called the "white" phase.

Figure 3:
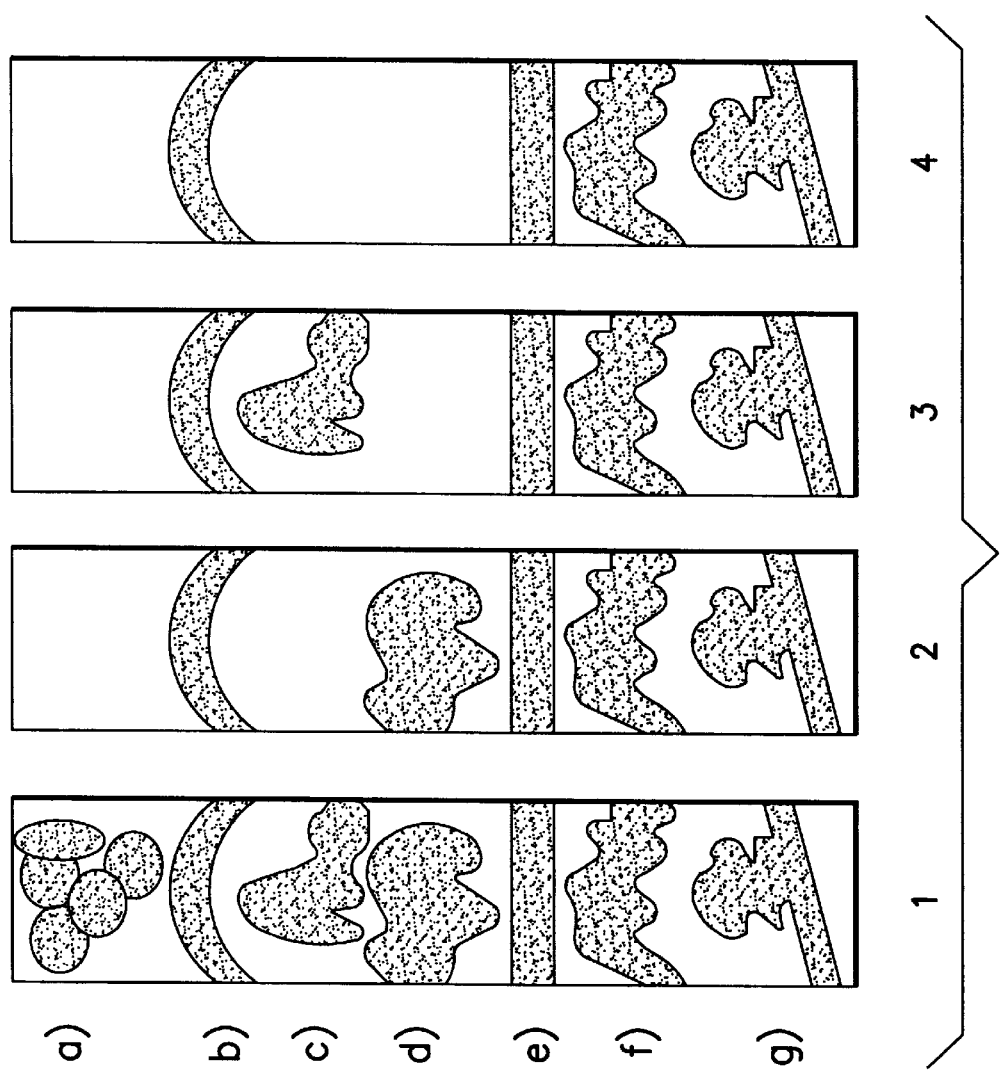

The following step is the construction of a "crossing-component image" as shown in FIG. 1-3.

The crossing-component image is obtained from the binary image of FIG. 1-2 by eliminating from the image those components of the black phase that do not extend all the way across the image, and symmetrically, all those components of the white phase that do not extend all the way across the image.

FIG. 3 illustrates the notion of a component that extends completely or all the way across the initial image, i.e. a "crossing" component:. A component of the image is a "crossing" component if it extends across the entire width of the image, or in other words if it connects with both edges of the image. Of the components (a) to (g) shown by way of example in FIG. 3-1, the components that constitute "crossing" components are the components (b), (e), (f), and (g) as shown in FIG. 3-4. Component (a) does not touch either edge, component (c) touches the right edge only, and component (d) touches the left edge only.

FIGS. 3-2 and 3-3 show how processing can eliminate adjacent but non-crossing components. Firstly, all components that do not touch the left edge of the image are eliminated. This eliminates the components (a) and (c), as can be seen in FIG. 3-2. Secondly, all components that do not touch the right edge are eliminated from the initial image: components (a) and (d) are thus eliminated, as shown in FIG. 3-3. Thereafter, the two resulting images are combined so as to retain only those components which touch both edges of the image. This gives rise to the image of FIG. 3-4 which constitutes the intersection of the images of FIGS. 3-2 and 3-3.

The corresponding processing is performed by a known type of morphological transformation called "reconstruction from markers". This operation is defined as "the result of successive geodesic expansions until a marker image is idempotent in an initial image", see the article by S. Beucher et al. entitled "Introduction aux outils morphologiques de segmentation" published in: Traitement d'images en microscopic balayage et en microanalyse par sonde electronique, ANRT 1990. In the present case, this transformation consists in taking one of the edges of the image as the marker, e.g. the left edge, and in performing reconstruction by geodesic expansion using a structuring element until the limits of the crossing component under consideration are reached, as shown in FIG. 3-2. This makes it possible to preserve the crossing components that touch the left edge of the image. The same operation is performed using the right edge of the image as the marker, thereby obtaining the result shown in FIG. 3-3.

The processing defined above serves to eliminate non-crossing components from the black phase from the image. Thus, with reference to the images of FIGS. 1-2 and 1-3, it can be seen that objects such as those referenced N1 and N2 in FIG. 1-2 are eliminated from the image of FIG. 1-3.

The construction of the crossing-component image also includes eliminating noncrossing components from the white phase. This is performed by processing that is exactly identical to that described above for the black phase, but as applied to the image obtained by inverting the image of FIG. 1-2, which image is called the "dual" image. This processing serves to eliminate objects such as those referenced B1 and B2 in FIG. 1-2 from the image of FIG. 1-3.

Overall, if a formation zone is considered in outline as being constituted by a continuous phase and by a dispersed phase, with the continuous phase being, for example, the white phase in the zone situated at about 1563 meters (m) and by the black phase in the zone lying between 1563.5 m and 1563.7 m, the crossing-component image may be presented as an image which is formed by replacing each heterogeneous zone by a homogeneous zone comprising solely the continuous phase in the zone under consideration.

On the basis of the images obtained by the above-described processing, various attributes can be determined to characterize morphology and to perform zoning.

A first attribute which is geometrical in nature, is the lateral variation in the thickness DLAT of the components (black or white) in the crossing-component image. In this case, "thickness" is the dimension of a component in the depth direction (vertical in the images of FIG. 1). This attribute DLAT may be defined as being the difference between the maximum and mininum values of the thickness of a component. It has the advantage of enabling bedded zones to be distinguished from other zones. Bedded zones are characterized by little lateral variation in thickness, e.g. less than a threshold which may suitably be selected to about 20 mm. The graphical representation of DLAT as a function of depth is thus a rectangular graph with each rectangle having the thickness of a crossing component for its base and the value of the DLAT attribute for its height.

Another attribute of geometrical nature is the percentage of the image area occupied by the black phase. This provides a morphological indicator of special interest when comparing the values of the attribute in the crossing-component image and in the initial binary image since, this difference shows up a continuous phase and the presence of non-crossing components. FIG. 4-B shows variations in this attribute for the raw binary image of FIG. 1-2 (AREA) and for the crossing-component image of FIG. 1-3 (XREA). In practice these attributes are calculated over a sliding depth window, for instance over 30 cm.

It may be observed that the values of AREA and of XREA are identical or close in bedded zones (see for example the zone situated between the levels 1562.2 m and 1562.4 m, or the level situated around 1563.9 m). They are also identical or close together in interwoven zones comprising black components and white components that are not crossing components and without a continuous phase. In contrast, the values AREA and XREA are significantly different in heterogeneous zones having black inclusions in a white background and in heterogeneous zones having white inclusions in a black background. In the first background as illustrated by the zone situated between 1562.5 m and 1562.2 m, as given by way of example, the value of AREA in the initial image is greater than the value of XREA in the crossing-component image. In the second example, an example of which is provided by the zone situated between 1563.4 m and 1563.7 m, the value of AREA is, on the contrary, less than the value of XREA.

It may be observed that although comparing the attributes AREA and XREA does not make it possible to distinguish bedded zones from interwoven zones, the above-defined attribute DLAT does make it possible to identify bedded zones specifically.

Figures 4A, 4B:
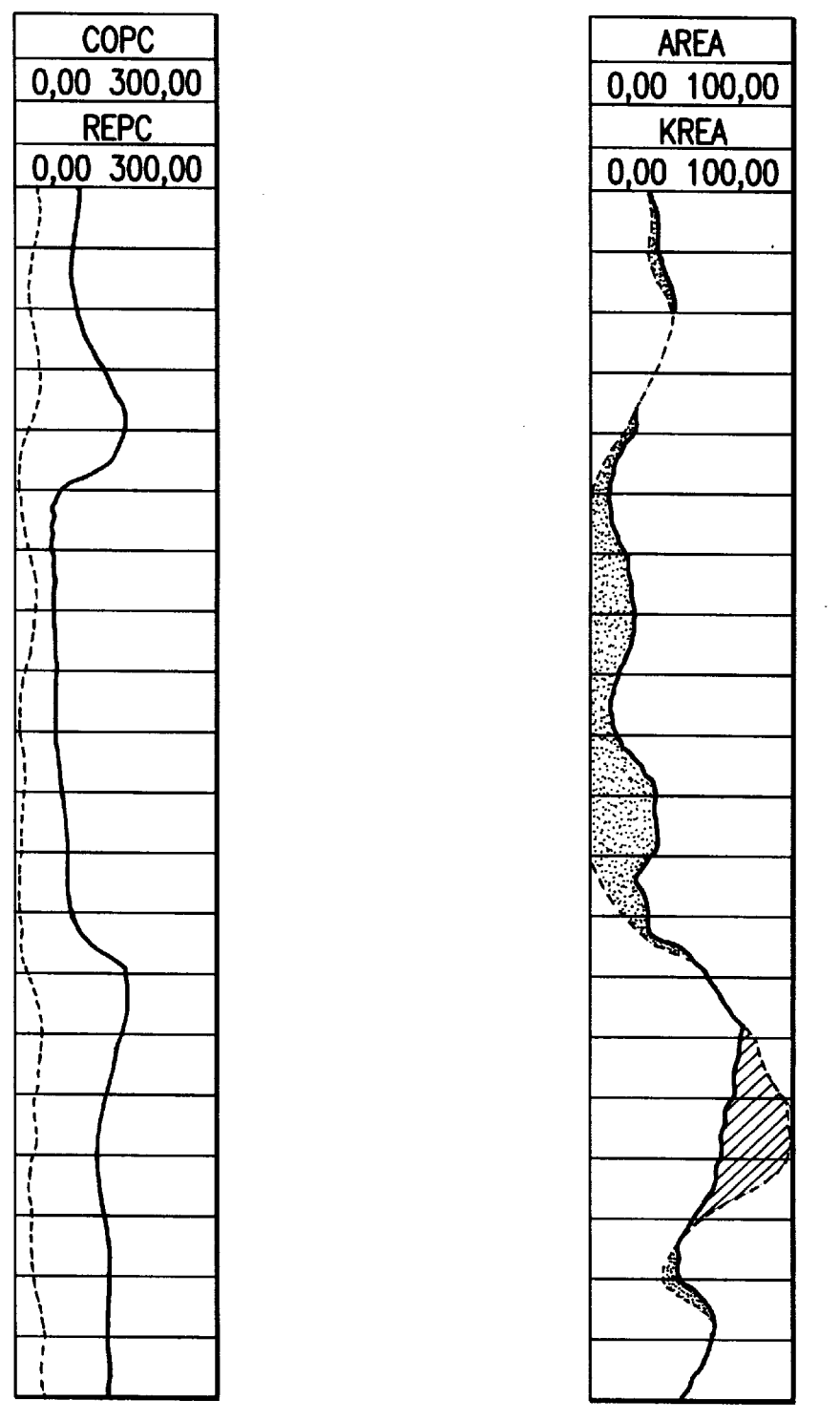

Another attribute enables solid zones to be identified specifically. This attribute is the value of the measured parameter, in the present example conductivity, expressed by a representative value over a set of pixels, such as the median value, for each of the portions of the initial image that correspond to the phases of the raw binary image. FIG. 4A shows such variations as a function of depth in the median conductivity COPC of the black phase and in the median conductivity REPC of the white phase, over a sliding depth window that may likewise appropriately extend over 30 cm.

The fact that the binary image comprises a "conductive" black phase and a "resistive" white phase is the result of a comparison with a background conductivity and gives no information on the amplitude of the difference between the conductivities of the two phases. Unfortunately, the difference between the conductivities is a significant magnitude. If the difference is small, less than some threshold, then the zone under consideration is a relatively homogeneous zone, which may be conductive or resistive, i.e. it is a solid zone. If the difference is greater than said threshold, then the zone is either bedded or heterogeneous.

In the example shown, the difference between the COPC and REPC attributes is never negligible, and it may be concluded that there is no solid zone in the section shown in the images of FIG. 1.

The attributes described above are given by way of preferred example since combinations thereof make it possible to obtain morphological zoning in simple manner. However, it is clear that other types of attribute may be defined with respect to the crossing-component image and/ or to the initial image for the purpose of constituting morphological indicators.

Figure 5:
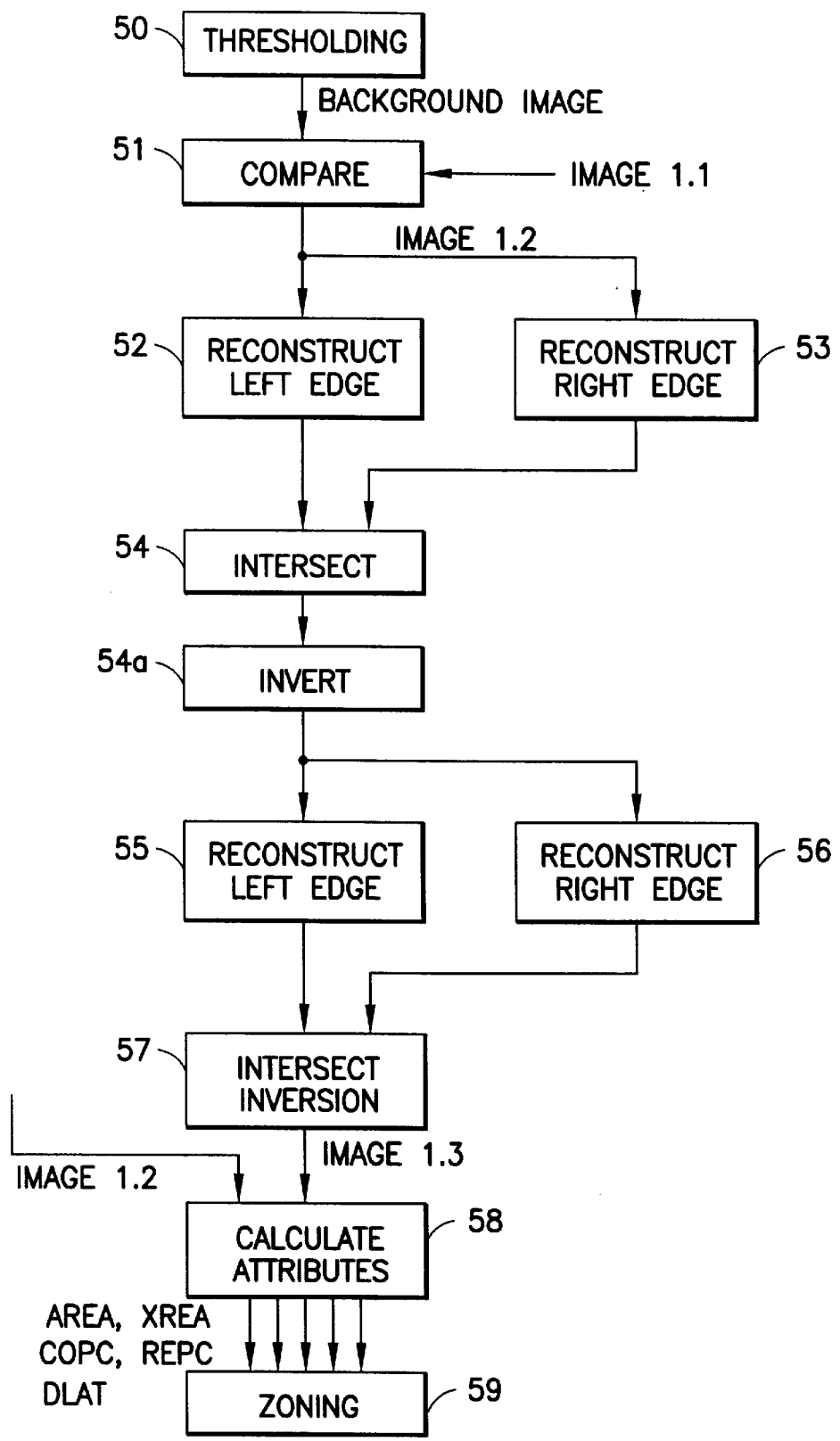
FIG. 5 is a flow chart showing the steps of the process in the implementation described.

The flowchart of FIG. 5 summarizes the processing described above. With an initial image made up of gray levels such as that of FIG. 1-1, the first step 50 is to define in adaptive manner an image threshold corresponding to background conductivity. Step 51 is comparing the initial image with the threshold image, thereby producing a raw binary image such as that given in FIG. 1-2. A crossing-component image is constructed from the raw binary image in steps 52–54 and 55–57. Steps 52–54 consist in eliminating non-crossing black phase components: reconstruction by means of a marker from the left edge (step 52); the same operation from the right edge (step 53); intersection between the images obtained at 52 and 53 (step 54). Similarly, steps 55–57 eliminate non-crossing components of the white phase, starting from the image given by step 54 but after phase inversion (step 54a): reconstituting from the left edge (step 55); reconstituting from the right edge (step 56); intersection of the images resulting from steps 55 and 56

(step 57). Finally, the image from step 57 after further inversion, is used in step 58 for determining the various attributes (AREA, XREA, DLAT, COPC, REPC) and described above, following a decision tree corresponding to the criteria defined for these various attributes, thus obtaining morphological zoning of the formations under consideration (step 59).

As mentioned above, the invention is not limited to the example described in which the image is split up in binary manner. The operations that produce a crossing-component image are applicable to an initial image that has a gray scale, or to an image having a number of phases greater than 2. For example, a ternary image could be produced, in which, instead of using a single threshold corresponding to the background conductivity, it is possible to use an upper threshold and a lower threshold that are disposed at equal distances on either side of the background conductivity: there would then be not only a "black" phase and a "white" phase, but also a background phase for conductivity values lying between said two thresholds. The basic principles whereby attributes are defined, as described above for a binary case, remain applicable, while the specific definitions would have to be adapted mutatis mutandis.

What is claimed is:

1. A method of morphologically surveying geological formations traversed by a borehole, comprising the steps of:

constructing an initial image of a wall of the borehole representative of variations in a physical parameter of the formation in a longitudinal direction of the borehole ("depth") and in a peripheral direction of the borehole wall ("laterally"), the initial image comprising image components which extend at least partially across the initial image of said parameter;

constructing from the initial image a "crossing-component image" which includes only those image components that extend completely laterally across the initial image from one side of the initial image to the other; and determining variations in at least one attribute relating to said parameter in the crossing-component image as a function of depth, said a least one attribute being selected to distinguish formations of different morphologies said variations vs. depth thereby providing information relating to morphology of the formation.

2. A method according to claim 1, in which said attribute is also determined for the initial image, and values obtained for the initial image and for the crossing-component image are compared, thereby providing additional information relating to morphology.

3. A method according to claim 1, in which variation in longitudinal thickness of the components of the crossing-component image is determined as an attribute.

4. A method according to claim 1, in which the initial image is made binary to form a two-phase image in which one phase ("white phase") corresponds to relatively high values of said parameter while the other phase ("black phase") corresponds to relatively low values thereof, said binary image serving as the initial image for constructing the crossing-component image.

5. A method according to claim 4, in which a percentage of an area of the image occupied by one of the phases is determined as an attribute.

6. A method according to claim 4, in which the crossing-component image is obtained by eliminating non-crossing components in the white phase and non-crossing components in the black phase from the binary image of the components.

7. A method according to claim 5 in which a value is determined as an attribute representing said parameter for each of the phases of the binary image, and the two resulting values are compared.

8. A method according to claim 6, in which a value is determined as an attribute representing one parameter for each of the phases of the binary image, and the two resulting values are compared.

9. A method of morphologically surveying geological formations traversed by a borehole, comprising the steps of:

constructing an initial image of a wall of the borehole representative of variations in a physical parameter of the formation in a longitudinal direction of the borehole and in a peripheral direction of the borehole wall, the initial image comprising image components which extend at least partially across the initial image of said parameter;

constructing from the initial image a crossing-component image which includes only those image components that extend completely laterally across the initial image from one side of the initial image to the other;

determining variations in at least one attribute relating to said parameter in the crossing-component image as a function of depth; and assigning a category chosen from a set of predetermined morphological categories to a given depth zone based on said variations of said at least one attribute.

* * * * *